Feb. 7, 1933.  S. BRAMSEN ET AL  1,896,833
OIL AND WATER EXTRACTOR
Filed March 25, 1931   3 Sheets-Sheet 1
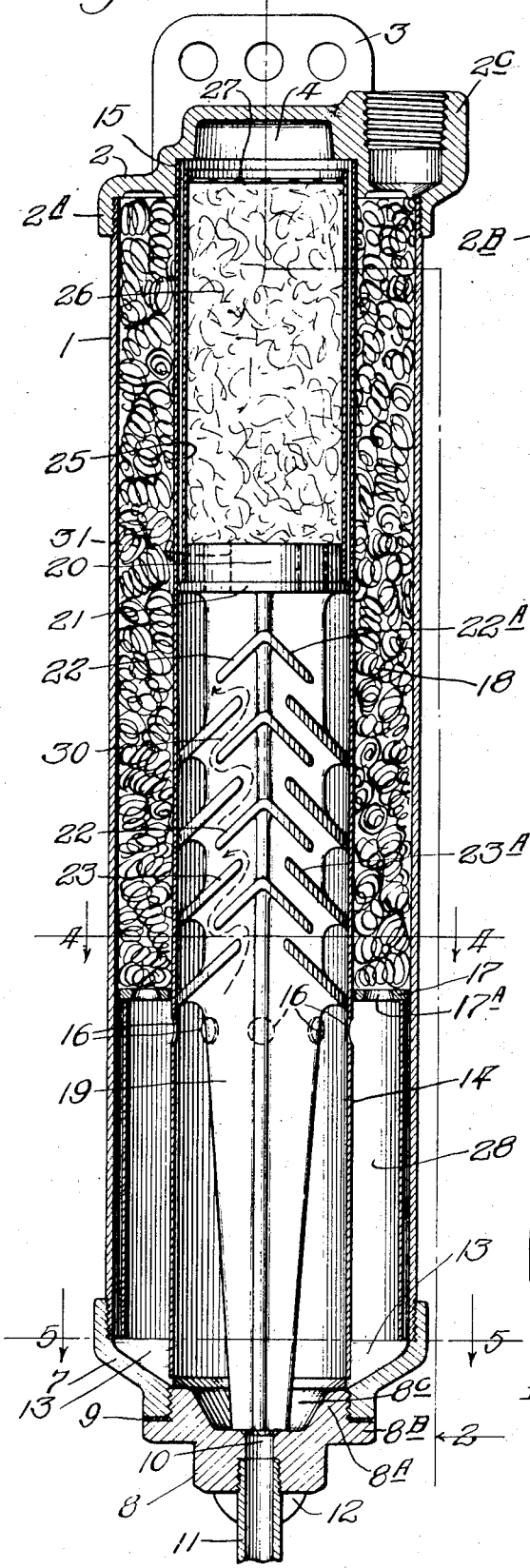
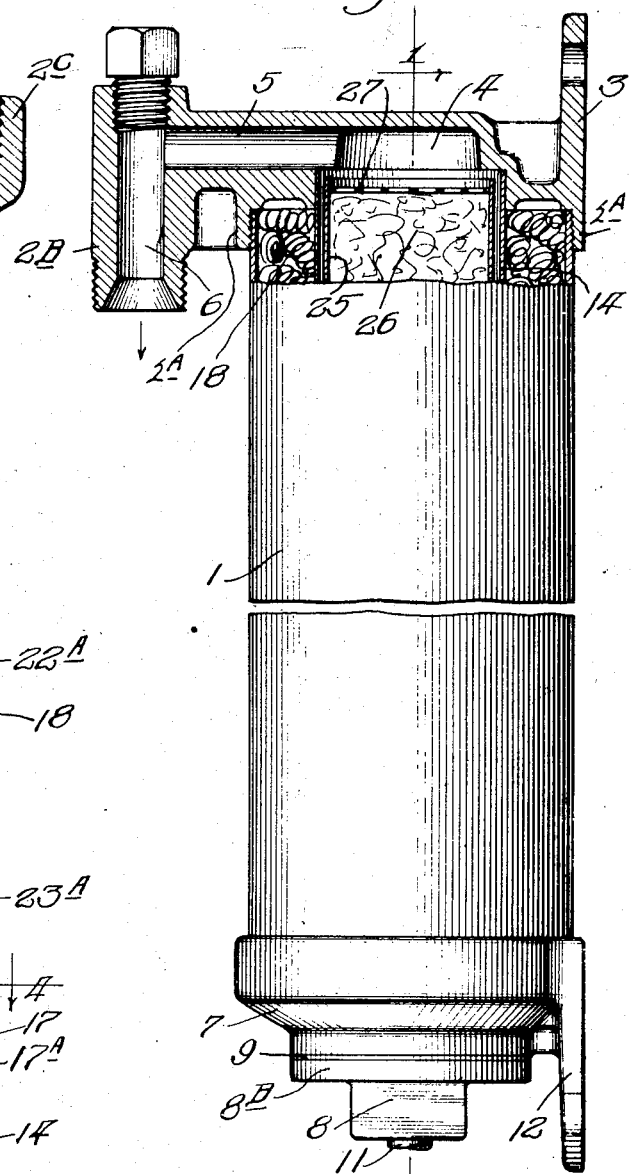
Inventors:
Svend Bramsen
and Fritz Wahlin
by Albert Scheible
Attorney

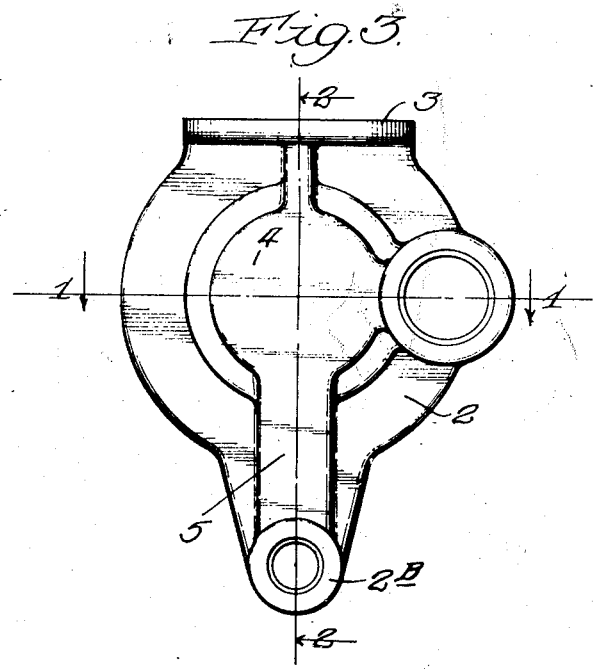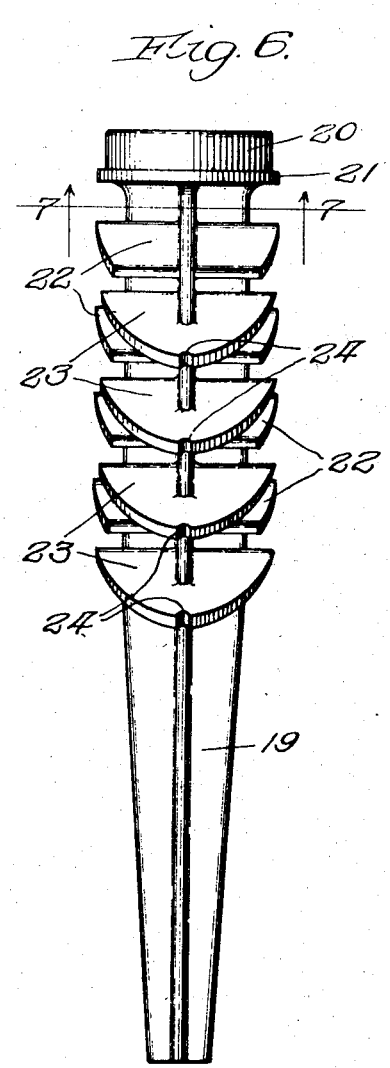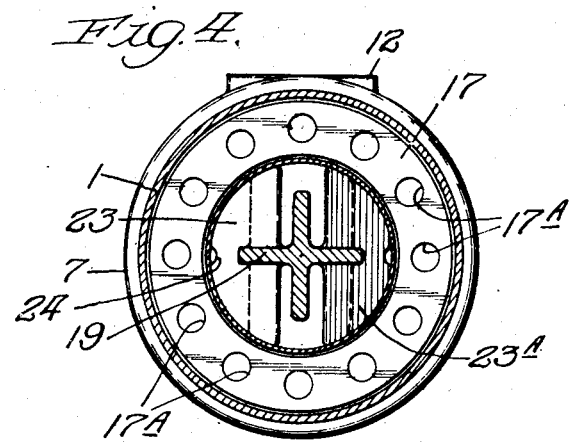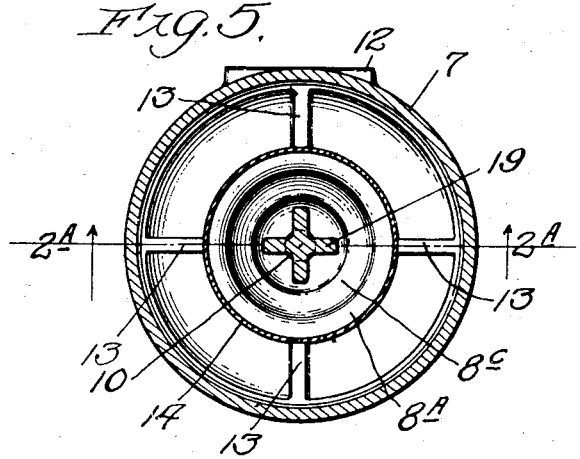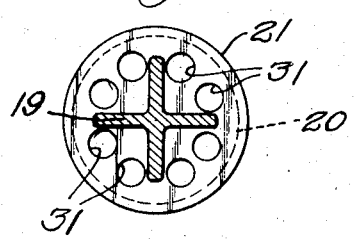

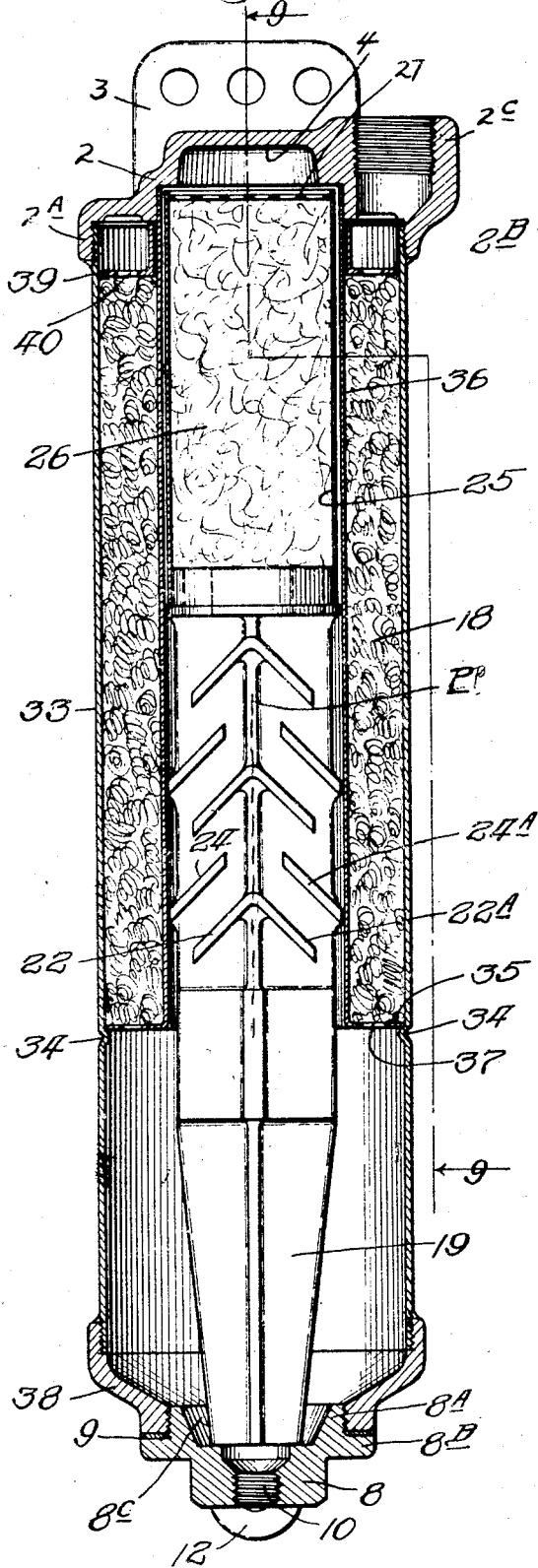
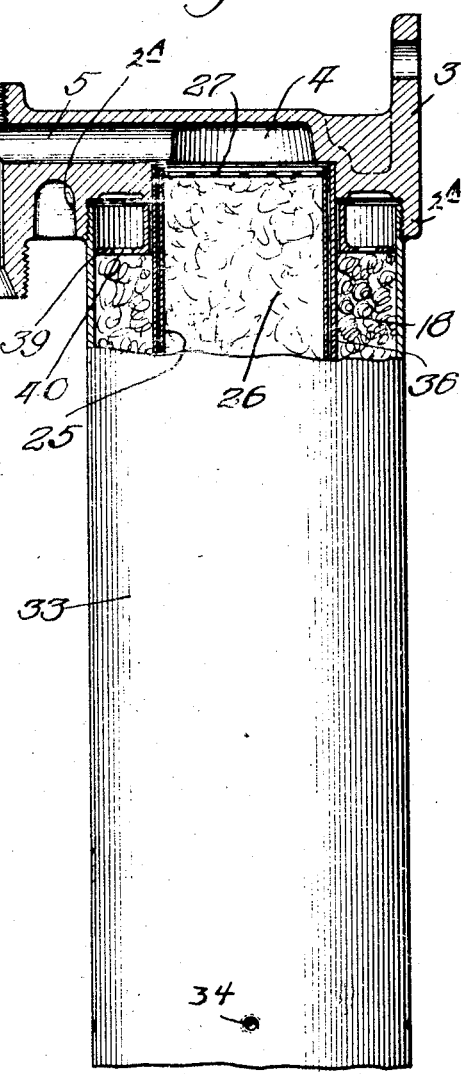

Patented Feb. 7, 1933

1,896,833

UNITED STATES PATENT OFFICE

SVEND BRAMSEN AND FRITZ WAHLIN, OF CHICAGO, ILLINOIS, ASSIGNORS TO BINKS MANUFACTURING COMPANY, OF CHICAGO, ILLINOIS, A CORPORATION OF DELAWARE

OIL AND WATER EXTRACTOR

Application filed March 25, 1931. Serial No. 525,070.

Our invention relates to liquid and gas separators, and in one of its general objects aims to provide an appliance of this class which will produce an effective separation of the gas from particles of liquid carried with the gas, without producing an undesirably large drop in the pressure of the gas.

In some further aspects, our invention aims to provide a separator of this class which will initially cause the separated liquid contents of the gas to collect into drops of such a size and weight that gravity will cause these drops to descend into the lower portion of the separator, while permitting the gas thereafter to ascend to a higher portion of the separator. Furthermore, our invention aims to provide simple and effective baffle means for collecting residual liquid contents of the ascending gas into further drops and causing these drops to flow out of the general path of the ascending gas, and for thereafter filtering the gas to clarify it.

Moreover, our invention aims to provide a separator of this class which will permit a ready removal of the baffle means and of the filtering means, so as to allow a cleaning of the baffle means and a renewal of the filtering material, and which can be constructed so as to permit this without detaching the initial-liquid-collecting means.

Furthermore, our invention aims to provide a separator of the above recited characteristics which will be durable, easily connected to the piping for the gas, and easily manufactured.

In its commercial applications, our invention is particularly suited for separating compressed air both from moisture present in the air and from lubricating oil carried with the air from the compressor; hence we are describing our invention in corresponding embodiments in the following specification, from which further and more detailed objects will appear, and are illustrating such embodiments in the accompanying drawings. However, we do not wish to be limited as to the uses of our here disclosed liquid and gas separator.

In the drawings, Fig. 1 is a central, vertical and longitudinal section through a liquid and gas separator embodying our invention, looking from the front of the separator.

Fig. 2 is a fragmentary side elevation of the same separator, with the upper portion sectioned in a plane at right angles to the section of Fig. 1, namely along the line 2—2 of Fig. 3.

Fig. 2 A is a diametric section of the annular bottom member of the casing of the separator.

Fig. 3 is a plan view of the cover casting of the separator.

Fig. 4 is a horizontal section taken along the line 4—4 of Fig. 1.

Fig. 5 is a horizontal section taken along the line 5—5 of Fig. 1.

Fig. 6 is a side elevation of the baffle member.

Fig. 7 is a horizontal section through the baffle member along the line 7—7 of Fig. 6, looking upwards.

Fig. 8 is a central and longitudinal section, taken in the same plane as Fig. 1 through another embodiment of our invention.

Fig. 9 is a fragmentary side elevation of the upper portion of the separator of Fig. 8, with a part thereof sectioned along the line 9—9 of Fig. 8.

In each of the illustrated embodiments, we accomplish the separation of liquid from the gas in the following general manner:

(1) By first having this fluid mixture pass downward within a tubular annular separating chamber containing metal shavings or the like upon which liquid will collect, and permitting the collected drops of liquid to pass by gravity into the lower sediment-collecting portion of the separator casing, into which lower portion the gas also passes.

(2) By next having the fluid follow a circuitous path upwardly between baffles disposed both for collecting residual liquid particles and for guiding the resulting drops of liquid out of the general path of the gas.

(3) By subsequently passing the gas through a body of highly porous filtering material for removing any still remaining impurities.

In the embodiment of Figs. 1 to 7 inclusive, the casing of our liquid and gas separator includes an upright shell 1 supported at its upper end by threading it into the depending flange 2 A of a cover 2 which has at its rear a supporting bracket 3. This cover is formed to provide a central discharge chamber 4 at higher elevation than the cover flange 2 A, and also to afford a duct 5 leading from the said chamber to an outlet passage 6, this passage being here shown as formed in an upright cover part 2 B which is threaded at its lower end for connection to the pipe or hose to which the purified gas is to be delivered. The cover also has an interiorly threaded portion 2 C adjacent to the cover flange 2 A to afford an inlet for the gas.

Threaded upon the lower end of the tubular shell 1 is a bottom casting 7 having a central bore into which the upwardly directed stem 8 A of a bottom plug 8 is threaded, and this plug has a peripheral flange 8 B underhanging the bottom casting and disposed for clamping a packing washer 9 against that casting. The plug 8 also has an axial bore 10 into which the upper end of a liquid discharge pipe 11 can be threaded, and the bottom desirably has at its rear a second supporting bracket 12.

The part of the bottom casting 9 radially outward of the bore into which the stem 8 A is threaded has a plurality of radial webs 13, each of which webs has near its inner ends a horizontal shoulder 13 A (Fig. 2 A). Seated at its lower end on these shoulders 13 A of the several webs 13 A is an inner tube 14 which has its upper end extending into and centered by a bore 15 formed in the top casting 2 below the said discharge chamber 4. This inner tube has a plurality of lateral ports 16 which desirably are disposed at a uniform height above the lower end of the tube and considerably below the mid-height of the tube.

Extending across the annular tubular space between the shell 1 and the inner tube 14 above the ports 16, and desirably near these ports, is a flat filling-supporting ring 17 (Fig. 4) which is provided with a plurality of perforations 17 A, and which ring supports a liquid collecting filling 18 in the said annular space. This filling preferably consists of metal elements formed so as to intercept the direct downward flow of fluid through the said annular space a large number of times, while occupying a relatively small fraction of that space. For this purpose, we have found thin shavings of copper or the like quite suitable.

Disposed within the inner tube 14, but of less height than the latter, is a baffle member, shown in front and side elevations respectively in Figs. 1 and 6, which baffle member also supports the filtering portion of our separator. This baffle member includes a downwardly tapering stem 19, an upper head 20 of somewhat smaller diameter than the bore of the inner tube 14 and a peripheral flange 21 underhanging the head and preferably slidably fitting the said bore of the tube 14; and the stem 19 of the baffle member desirably is of a cross-shaped transverse section as shown in Fig. 5, so as to occupy only a small fraction of the space within the portion of the inner tube 14 which houses this stem.

The baffle member also has a plurality of baffle webs disposed between the flange 21 and the ports 16 in the inner tube, the superposed baffle webs being in relatively staggered disposition so as to compel the rising gas to follow circuitous paths. Moreover, the major peripheral portions of all of the baffle webs are preferably formed for slidably fitting the bore of the inner tube 14, and some of these webs have upright notches 24 in their peripheral portions to afford liquid passages close to the said bore.

To obtain such a baffle web arrangement in a baffle member consisting of a simple casting, we desirably dispose the baffle webs in two sets which diverge downwardly from a common vertical plane P (Fig. 8), the superposed webs in each set extending alternately to one of the cross-forming webs of the stem 19 and beyond the lateral edges of this stem to the bore of the inner tube 14. Thus, Figs. 1 and 6 show as one of these sets four pairs of downwardly diverging baffle webs 22 and 22 A, with the webs of each pair merging into one of the cross-forming webs of the stem 19 but having their lower ends spaced by considerable distances from the bore of the inner tube 14. Interposed between each two consecutive pairs of interconnected baffle webs 22 and 22 A are two spaced baffle webs 23 and 23 A which have their inner edges freely spaced from each other, while their outer edges are curved for slidably fitting the bore of the said inner tube, and each such outer edge portion has an upright liquid discharging notch 24.

Sleeved upon the head 20 of the baffle member and seated on the flange 21 of that member is the lower end of a tube 25 which forms the peripheral wall of a filter casing and which is nearly filled with a highly porous filtering material—as for example loose felt 26. This filtering material desirably has a perforated disc 27 resting on it to keep the said material from spilling out of the tube 25 during the attaching or detaching of the filtering means along with the baffle member.

When our separator is in use—as for example, between an air compressor and an appliance operated by compressed air—the air is admitted through the cover inlet 2 C and first flows downwardly through the annular chamber between the shell 1 and the inner tube 14. Since this chamber can readily be of many times greater cross-sectional area than the inlet 2 C, the admitted air expands within it and readily distributes itself within this chamber perpherally of the inner tube; consequently, the metal shavings 18, although presenting considerable air spaces between them, will also have surface portions of large total area traversed by the air while this air follows the highly circuitous paths between different parts of the shavings. As the result, a large proportion of the oil or water which has been carried into the air pipe from the compressor in vaporized form will condense on these shavings and will collect into drops, and these drops will partly trickle through the mass of shavings and partly flow down along the outer wall of the inner tube 14 and along the bore of the shell 1.

The resulting drops of liquid will then fall by gravity through the perforations 17 A in the shavings-supporting ring 17 into the bore of a drip-confining tube 28 which seats on the upper edges of the radial webs 13 of the bottom member and which tube supports the said ring 17. Since the proportion of such oil, water or other liquid to the air is usually quite small, the trickling or dropping of the shavings-collected liquid through the said perforations 17 A will not impede or interfere with the speedy passage of the air through these perforations.

After thus reaching the annular drip chamber (between the drip-confining tube 28 and the lower part of the inner tube 14) the air passes through the ports 16 of the inner tube into the interior of the latter and flows upwardly between baffle webs in circuitous paths, as for example along the dotted lines 30 in Fig. 1. During this winding between the baffle webs, the wide face portions of these webs also cause any residual liquid in the air to collect on these webs, and the inclination of these webs will cause such collected liquid to flow downward and outward to the peripheral portions of the arcuate-edged baffle webs 23 and 23 A.

Since each of these webs 23 and 23 A has an upright discharge notch 24 in its lowermost outward portion, toward which any liquid on the upper face of such a web will flow, this liquid will either drop by gravity through these notches or flow down along the bore of the inner tube 14 so as to reach the outlet bore 10 of the bottom member. To facilitate the flow of liquid to the said outlet bore, we preferably form the upper end of the plug 8 with a cup-shaped depression 8 C, as shown in Fig. 1.

When the upwardly flowing air or other gas has passed the uppermost baffle webs, this gas enters the interior of the filter casing through upright bores 31 in the head 20 of the baffle member, and passes through the filtering material 26 and on through the perforations in the filter-covering disk 27 to the discharge chamber 4, from which chamber the gas reaches the outlet 6 through the duct 5.

In practice, the total area of the perforations 17 A in the shavings-supporting ring 17 can readily be made considerably greater than the effective area of the inlet 2 C, and a similarly greater total area than that of the inlet can also be provided for the inner tube ports 16, the head ports 31 and the filter-covering-disk ports. So also, the filtering material 26 can be highly porous, so that its effective air-passage area (particularly when housed by a tube 25 of much greater diameter than the bore of the gas inlet 2 C) will also be considerably greater than the effective area of the said gas inlet bore. Consequently, our separator, although affording two consecutive liquid-condensing and liquid-collecting means, together with a supplemental gas-filtering provision, does not materially retard the flow of the gas. Indeed, we have found in practice that our above described liquid and gas separator, when interposed between an air compressor and a group of paint-spraying appliances will cause a much lower drop in pressure than heretofore customary liquid and gas separators of much smaller liquid-separating effectiveness.

In the simplified embodiment of Figs. 8 and 9, our separator has the same cap member, baffle member, filtering arrangement and bottom plug as in the previously described embodiment. However, the shell 33 has circumferentially spaced indentations 34 which afford inward projections for conjointly supporting an outwardly directed radial flange 35 on the lower end of the inner tube 36. This lower tube end is disposed considerably above the lower end of the shell 33 and the flange 35 has a plurality of perforations 37, so that this shell-supported flange serves as a substitute for a flat shavings-supporting ring 17 in Fig. 1; thereby making it unnecessary to provide the ring-supporting tube 28 of Fig. 1, and also eliminating the need of the webs 13 (Fig. 1) in the annular bottom member of the casing.

With each of the illustrated embodiments, the baffle member, and the filter-housing tube 25 together with the filtering material and the retaining disk 27 constitute a unit which will slide out by gravity when the bottom plug 8 is detached from the annular bottom member of the casing, thereby permitting a convenient renewal of the filtering material as well as a cleaning of the baffle member.

In both of the illustrated embodiments, the metal shavings or other liquid-collecting particles 18 can readily be inserted from the top of the casing before the shell 33 is threaded into the cap; and when this shell is unscrewed from the cap, these shavings can be poured out for cleaning them or for substituting others.

In practice, we may also provide an anglesectioned shavings-retaining ring 39 for spacing the top of the shavings from the air inlet, thereby facilitating the flow of the entering gas around the upper portion of the inner tube (14 or 38), so that this gas will be more speedily distributed (through ports 40 in the horizontal flange of the ring 39) through the shavings. When disposed as in Figs. 8 and 9, the upright web of this ring will engage the top casting 2 if our separator is swung to a horizontal position or is inverted, thereby retaining the shavings within the shell of the separator during the shipping of the latter.

However, while we have heretofore described our invention in embodiments including numerous desirable details of construction and arrangement, we do not wish to be limited in these respects, since changes could obviously be made without departing either from the spirit of our invention or from the appended claims. So also, we do not wish to be limited to the materials employed for its various parts. Nor do we wish to be limited to the conjoint use of numerous features of invention, particularly since the air filtering provision may not be needed for many uses to which our separator is suited.

We claim as our invention:

1. In a liquid and gas separator, an upright tubular shell, a relatively smaller-diametered inner tube disposed within the shell concentric with the shell, a filling of liquid-collecting material in the annular space between the said tube and the upper portion of the shell, means within the shell for supporting the liquid collecting material, baffle means housed by the inner tube intermediate of the height of the tube, and gas-filtering means housed by the inner tube above the baffle means.

2. In a liquid and gas separator, an assemblage of elements as per claim 1, including unitary means for supporting the baffle means and the filtering means.

3. In a liquid and gas separator, an assemblage of elements as per claim 1, including a filter casing laterally housing the filtering means, and single means for supporting the filter casing and the baffle casing.

4. In a liquid and gas separator, an upright housing, means partitioning the housing to afford an annular tubular chamber therein with the bottom of the chamber spaced upwardly from the bottom of the housing, the bottom of the chamber having perforations to permit fluid to issue downwardly from the said chamber; liquid collecting means disposed in the said chamber; baffle means disposed inwardly of the said chamber and above the bottom of the chamber, the housing having an annular bottom member and a detachable closure for the said member; and means for supporting the baffle means from the said closure.

5. A liquid and gas separator including an upright housing having an inlet and an outlet both in its upper portion; liquid-collecting means disposed in annular formation in the radially outer portion of the housing and spaced upwardly from the bottom of the housing, baffle means housed by the said liquid collecting means, partitioning means within the housing for compelling fluid admitted through the top of the housing to pass downwardly first through the liquid collecting means and thereafter upwardly past the baffle means, means for supporting the liquid-collecting means from the housing, and an annular retainer member resting upon the top of the liquid-collecting means.

6. In a liquid and gas separator, an upright tubular shell, an inner and relatively smaller-diameter upright tube disposed in the upper portion of the shell concentric with the shell, a filling of liquid-collecting material in the annular space between the said shell and tube, material-supporting means intermediate of the height of the shell for supporting the liquid collecting material; baffle means housed by the inner tube; and an annular bottom member attached to the shell and of larger bore than the baffle means, a plug normally closing the bore of the said bottom member, and means for supporting the baffle means from the plug.

7. In a liquid and gas separator, an upright tubular shell, an inner and relatively smaller-diametered upright tube disposed in the upper portion of the shell concentric with the shell, a filling of liquid-collecting material in the annular space between the said shell and tube, material-supporting means intermediate of the height of the shell for supporting the liquid collecting material; baffle means housed by the inner tube; the means for supporting the liquid collecting material consist of a horizontal and perforated flange integral with the inner tube, thereby permitting the said flange and the material supported by it to be withdrawn from the outer shell conjointly with the inner tube.

8. In a liquid and gas separator, an upright tube through which the mixture of liquid and gas flows upwardly, and a baffle member coaxial with the tube; the baffle member comprising a stem presenting two flat upright webs at right angles to each other, and baffles fast upon the stem; the baffles being arranged in pairs with each alternate pair diverging downwardly from one of the said webs, and with the other pairs extending across the other web.

9. In a liquid and gas separator, a tube and baffle member assembly as per claim 8, in which the lower edge of each baffle has its major portion fitting the bore of the tube.

10. In a liquid and gas separator, a tube and baffle members assembly as per claim 8, in which the said other pairs of baffles have the upper edges of the baffles of each pair freely spaced from each other by a distance less than the spacing of the upper ends of the baffles of each pair alternating with the said other pairs.

11. In a liquid and gas separator, an upright tube through which the mixture of liquid and gas flows upwardly; an upright baffle member including relatively superposed baffles disposed within the tube; the baffle member having at its upper end a head provided with apertures, the head having a peripheral flange spaced from its top and engaging the bore of the tube; a second tube having its lower portion sleeved upon the said head and having its lower end seated upon the said flange, a filling of filtering material in the second tube, and a perforated disk disposed within the tube and resting upon the top of the filtering material to retain that material within the tube.

Signed at Chicago, Illinois, March 21st, 1931.

SVEND BRAMSEN.
FRITZ WAHLIN.